(12) United States Patent
Wu et al.

(10) Patent No.: US 12,743,846 B2
(45) Date of Patent: Sep. 22, 2026

(54) MODELING DEVICE AND MODELING METHOD FOR 3D OBJECT

(71) Applicant: DELTA ELECTRONICS, INC., Taoyuan City (TW)

(72) Inventors: Hsing-Hsuan Wu, Taoyuan City (TW); Keng-Ning Chang, Taoyuan City (TW); Chia-Jun Yu, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 196 days.

(21) Appl. No.: 18/453,091

(22) Filed: Aug. 21, 2023

(65) Prior Publication Data

US 2024/0386663 A1 Nov. 21, 2024

(30) Foreign Application Priority Data

May 17, 2023 (CN) ......................... 202310557630.8

(51) Int. Cl.
*G06T 17/00* (2006.01)

(52) U.S. Cl.
CPC .......... *G06T 17/00* (2013.01); *G06T 2210/12* (2013.01)

(58) Field of Classification Search
CPC ..... G06T 17/00; G06T 2210/12; G06T 19/20; G06T 2219/2008; G06F 30/20; B25J 9/1605
See application file for complete search history.

(56) References Cited

U.S. PATENT DOCUMENTS 6,714,201 B1 * 3/2004 Grinstein ................ G06T 13/20 700/61
2014/0114617 A1 * 4/2014 Newhard ................ G06F 30/39 703/1

(Continued)

FOREIGN PATENT DOCUMENTS

CN 105608249 A 5/2016
CN 114683288 A 7/2022
CN 115008439 A 9/2022

OTHER PUBLICATIONS

Delano, Jake. 'Tech Tip: How to Use the Group and Fix Tools When Importing Models Into Onshape' [online]. Onshape. Jul. 13, 2021 [retrieved on Apr. 28, 2025-04-28]. Retrieved from the Internet: <URL:https://www.onshape.com/en/resource-center/tech-tip>. (Year: 2021).*

(Continued)

*Primary Examiner* — King Y Poon
*Assistant Examiner* — Michelle Hau Ma
(74) *Attorney, Agent, or Firm* — MUNCY, GEISSLER, OLDS & LOWE, P.C.

(57) ABSTRACT

A modeling device and a modeling method for three-dimension objects are provided. The modeling method includes loading a motion model of a model object, where the motion model indicates a motion level of each of a plurality of model components of the model object; receiving an object to be modeled including a plurality of components; reading a component attribute of each component; adjusting the motion level of each model component based on the component attribute of each component to generate a modeled component including the component attribute; and obtaining a modeled object after setting the motion level of (Continued)

each model component, where the modeled object includes the modeled components respectively corresponding to the model components.

10 Claims, 9 Drawing Sheets

(56) References Cited

U.S. PATENT DOCUMENTS

| | | | | |
|---|---|---|---|---|
| 2015/0178414 | A1* | 6/2015 | Gibson | G06F 30/00 703/1 |
| 2015/0321427 | A1* | 11/2015 | Gunnarsson | G05B 19/4099 700/98 |
| 2016/0140261 | A1 | 5/2016 | Beavin et al. | |
| 2016/0189433 | A1* | 6/2016 | Dayde | G06F 3/04815 345/419 |
| 2019/0147221 | A1 | 5/2019 | Grabner et al. | |
| 2019/0147317 | A1* | 5/2019 | Divekar | G06F 30/00 706/20 |
| 2019/0392653 | A1* | 12/2019 | Varanasi | G06T 19/20 |
| 2020/0234498 | A1* | 7/2020 | Price | G06T 7/12 |
| 2022/0155752 | A1* | 5/2022 | Søndergaard | G06F 30/00 |
| 2022/0281103 | A1 | 9/2022 | Maeda | |
| 2024/0169553 | A1* | 5/2024 | Yoon | G06T 15/04 |

OTHER PUBLICATIONS

Screen captures from YouTube video clip entitled "Tech Tip: Add and Mate Parts in Assemblies Using Onshape's Snap Mode", uploaded on Nov. 22, 2022 by user "Onshape". Retrieved from Internet: <https://www.youtube.com/watch?v=WJ2suwnil7l>. (Year: 2022).*

Screen captures from YouTube video clip entitled "Solidworks—Assembly Training-Coordinate Systems", uploaded on Dec. 7, 2022 by user "S Kenna". Retrieved from Internet: <https://www.youtube.com/watch?v=cbFR-DdjUSg>. (Year: 2022).*

Zhu et al. Motion-Guided Mechanical Toy Modeling [Online]. Nov. 2012 [Retrieved on Aug. 21, 2025]. Retrieved from the Internet: <URL: https://dl.acm.org/doi/pdf/10.1145/2366145.2366146 > (Year: 2012).*

Mitra et al. Illustrating How Mechanical Assemblies Work [Online]. Jan. 2013 [Retrieved on Aug. 21, 2025]. Retrieved from the Internet: <URL: https://dl.acm.org/doi/10.1145/2398356.2398379 > (Year: 2013).*

Office Action dated Jun. 30, 2023 of the corresponding Taiwan patent application No. 112118267.

* cited by examiner

MODELING DEVICE AND MODELING METHOD FOR 3D OBJECT

BACKGROUND OF THE DISCLOSURE

Technical Field

The disclosure generally relates to a modeling device and a modeling method, and more particularly, to a modeling device and a modeling method for a three-dimension object.

Description of Related Art

Modeling methods of integration of virtual and reality in the related art require users' experience to establish models. While modeling, the user needs to set motion levels of components and connection relationships among the components one by one to carry out a preliminary configuration of the model structure. Further, the user needs to set motion attribute values of the components based on the motion levels one by one (such as angle value, range of rotations, motion speed limits, friction forces, and damping forces of the components). During the modeling procedure, the user has to set parameters of each component of the model object, and it is not only a waste of time but also easily making mistakes.

The three-dimension modeling technique may be applied to different technical fields, but it takes time for modeling and the modeling procedure is cumbersome. When any demand for using object models arises, the user has to program the modeling procedure based on the operation feature and the attribute of the object. Accordingly, how to improve the cumbersome modeling procedure is a technical problem urged to be solved.

SUMMARY OF THE DISCLOSURE

One of the exemplary embodiments of the present disclosure is to provide a modeling device for three-dimension objects including a storage media and a processor. The storage media is configured to store a plurality of program codes. The processor is connected with the storage media and configured to load the plurality of program codes to execute operations including: loading a motion model of a model object, where the motion model indicates a motion level of each of a plurality of model components of the model object; receiving an object to be modeled including a plurality of components; reading a component attribute of each of the plurality of components; adjusting the motion level of each of the plurality of model components based on the component attribute of each of the plurality of components to generate a modeled component including the component attribute; and obtaining a modeled object after the motion level of each of the plurality of model components is set, where the modeled object includes the modeled components respectively corresponding to the plurality of model components.

One of the exemplary embodiments of the present disclosure is to provide a modeling method for three-dimension objects including loading a motion model of a model object, where the motion model indicates a motion level of each of a plurality of model components of the model object; receiving an object to be modeled including a plurality of components; reading a component attribute of each of the plurality of components; adjusting the motion level of each of the plurality of model components based on the component attribute of each of the plurality of components to generate a modeled component including the component attribute; and obtaining a modeled object after setting the motion level of each of the plurality of model components, where the modeled object includes the modeled components respectively corresponding to the plurality of model components.

It is understood that both the foregoing general description and the following detailed description are by examples, and are intended to provide further explanation of the disclosure as claimed.

DETAILED DESCRIPTION

Figure 1:
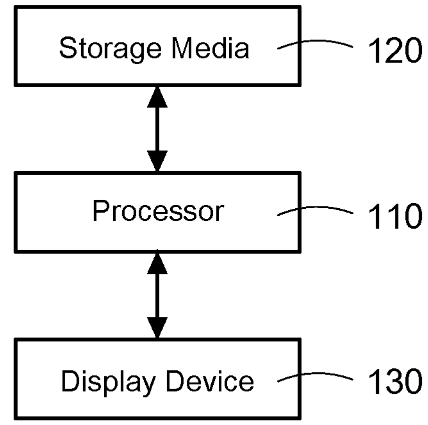
FIG. 1 is a block diagram illustrating a modeling device in accordance with one embodiment of the present disclosure.

The technical terms "first", "second", and the similar terms are used to describe elements for distinguishing the same or similar elements or operations and are not intended to limit the technical elements and the order of the operations in the present disclosure. Furthermore, the element symbols/alphabets can be used repeatedly in each embodiment of the present disclosure. The same and similar technical terms can be represented by the same or similar symbols/alphabets in each embodiment. The repeated symbols/alphabets are provided for simplicity and clarity and they should not be interpreted to limit the relation of the technical terms among the embodiments.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a block diagram illustrating a modeling device in accordance with one embodiment of the present disclosure. The modeling device 10 classifies types or structures of an object to be modeled in advance and establishes a standard framework for each type of the object, so a user follows the guidance of the standard framework to take actions correspondingly to finish establishing the three-dimension object model without establishing the three-dimension object model from an empty model by himself/herself.

In one embodiment, the modeling device 10 includes a processor 110 and a storage media 120 electrically or wirelessly connected with the processor 110. The storage media 120 is configured to store a plurality of program codes. After the program codes are loaded into the processor 110, the processor 110 executes operations of establishing the model of the present disclosure.

In one embodiment, the modeling device 10 includes a display device 130. The display device 130 is connected with the processor 110 and configured to display an interactive interface. The user watches instructions on the interactive interface and operates intuitively to control the modeling device 10 for establishing the model.

In one embodiment, the modeling device 10 may be, but not limited to, a tablet computer, a laptop, a personal computer, or an electronic device having a processor and/or a storage device and may execute applications installed thereon and/or on a cloud server.

In one embodiment, the processor 110 may be but not limited to a Digital Signal Processor (DSP), an Application Specific Integrated Circuit (ASIC), a Central Processing Unit (CPU), a System on Chip (SoC), a Field Programmable Gate Array (FPGA), or a Network Processor IC.

In one embodiment, the storage media 120 may be but not limited to a Random Access Memory (RAM), a nonvolatile memory (such as flash memory), a Read-Only Memory (ROM), a Hard Disk Drive (HDD), a Solid-State Drive (SSD), or an Optical Storage.

In one embodiment, the display device 130 may be but not limited to a display monitor or a projector.

Figure 2:
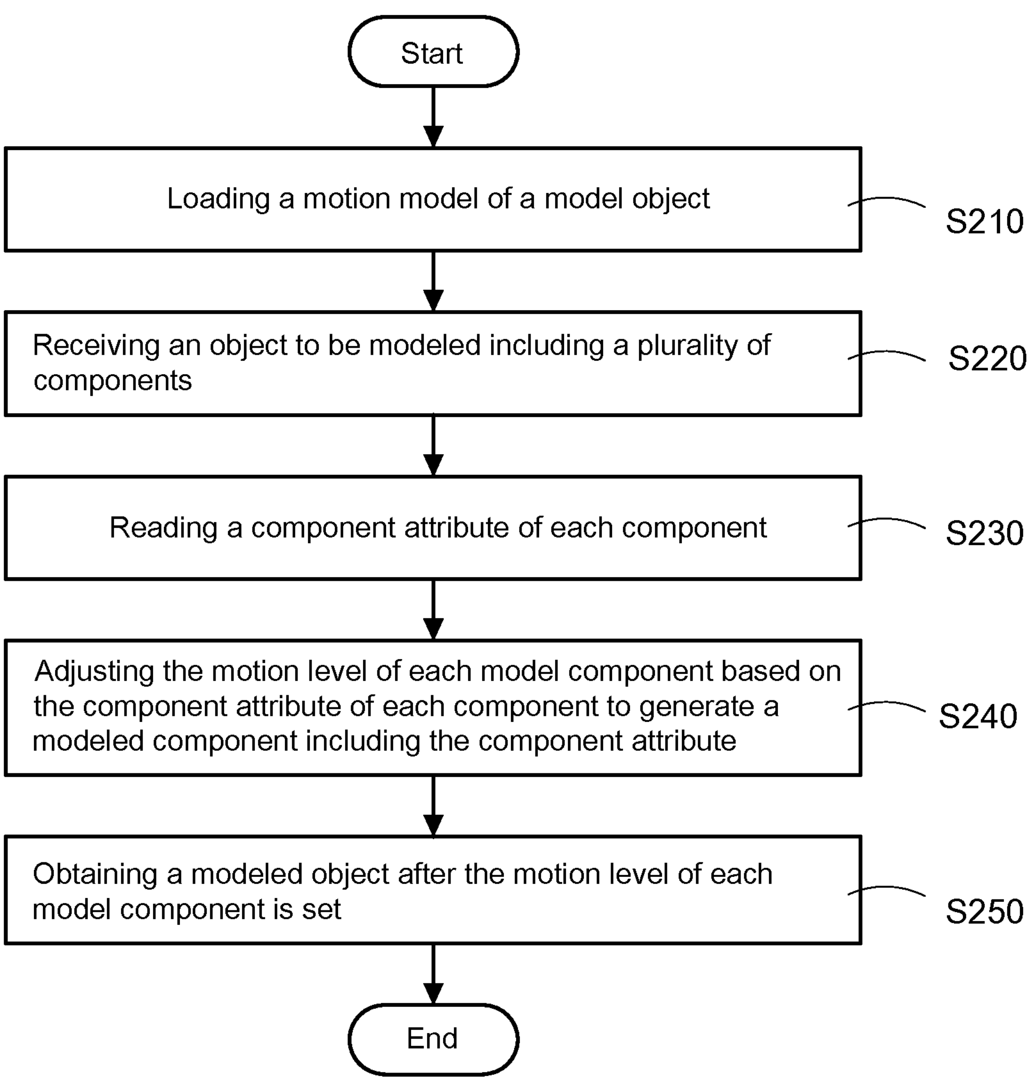
FIG. 2 is a flowchart illustrating a modeling method in accordance with one embodiment of the present disclosure.

Reference is made to FIG. 2 for the detailed statement of operations of establishing the model. FIG. 2 is a flowchart illustrating a modeling method in accordance with one embodiment of the present disclosure. The modeling method in FIG. 2 is performed by the modeling device 10 in FIG. 1. In one embodiment, after loading the program codes, the processor 110 executes the operations below.

In operation S210, the processor 110 loads a motion model of a model object and stores the motion model in the storage media 120.

In one embodiment, the model object is a framework designed according to the function types of machine parts of a mechanical device, conditions of a related movement, or conditions of a constraint movement among the machine parts, and the framework is applied to establish a virtual three-dimension object. The types of machine parts are various. For example, the types of machine parts may be a two-finger gripper, a selective compliance assembly robot arm (SCARA) robot, an articulated robot, or an XYZ liner platform, and they are not limited herein. The model object is applied to establish the framework of the virtual three-dimension object of the two-finger gripper, the SCARA robot, the articulated robot, or the XYZ liner platform.

In one embodiment, the model object includes a plurality of model components, and the relative movements among the model components form the function of the model object. As mentioned above, the modeling device and the modeling method of the present disclosure apply different types of model objects, and the model components of each type of the model object generally correspond to the machine parts of the mechanical device. The user may design the motion model of the model object based on the actual demand and the motion model may be implemented by the processor 110 to satisfy the structure of the mechanical device.

The motion model of the model object is the motion relation of the model components defined in the program codes. In one embodiment, the motion model includes a motion level of each model component in the model object and a motion type among the model components.

For the sake of understanding the design of the motion model, the model object of the two-finger gripper is taken as one example as follows.

The functional structure of the two-finger gripper includes two links and a base. The two links are respectively two fingers of the gripper. The base connects with the two links. The two-finger gripper includes a driving module disposed on the base, and the driving module is configured to control the movement of the two fingers of the gripper to grasp or put down an object.

Figure 3:
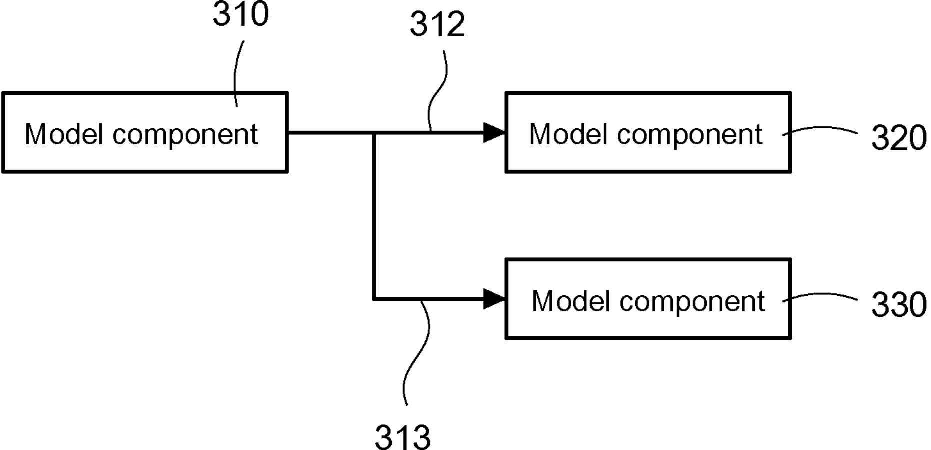
FIG. 3 is a schematic diagram illustrating a motion model of a two-finger gripper in accordance with one embodiment of the present disclosure.

Reference is made to FIG. 3. FIG. 3 is a schematic diagram illustrating a motion model of a two-finger gripper in accordance with one embodiment of the present disclosure. In the embodiment, the model object of the two-finger gripper includes three model components: model components 310, 320, and 330.

In one embodiment, the model component 310 corresponds to the base of the two-finger gripper, the model component 320 corresponds to one finger of the two-finger gripper, and the model component 330 corresponds to the other finger of the two-finger gripper.

In the embodiment, the motion level of the model component 310 is the base link; the motion level of the model components 320 and 330 is the slide link. It should be noted that the present disclosure designs the motion level of each of the model components of the model object based on the types of mechanical linkages and the motion relation among the mechanical linkages, and the set of the motion levels of all the model components is the motion model of the model object.

In one embodiment, the motion type is a collaborative operation among the model components. The motion type may be a rotation or a slide.

In the embodiment mentioned above, the model 310 is the base link that connects the two slide links, so a motion type 312 between the model component 310 and the model component 320 is "slide" representing that the model component 310 and the model component 320 collaboratively operate by sliding. Similarly, a motion type 313 between the model component 310 and the model component 330 is "slide".

The architecture of the motion model mentioned above indicates that the collaborative operation between the model component 310 and the model component 320 is the slide relation, and the collaborative operation between the model component 310 and the model component 330 is also the slide relation.

The processor 110 establishes the motion model of different types of model objects in advance, and the motion model indicates the motion level of each model component. As described above, the motion level of the model component 320 (one finger of the two-finger gripper) is the slide link.

In one embodiment, each motion model corresponds to the structure of the mechanical device, for example, the motion model in FIG. 3 corresponds to the structure of the mechanical device of the two-finger gripper. The modeling device 10 establishes a plurality of motion models and stores them in the storage media 120 to broaden the variety of the models.

In one embodiment, the motion model stores a framework attribute of the model object (e.g., the motion level of each of the model components and the motion type among the model components). For providing the user to fast establish a customized virtual three-dimension object by applying the model provided in the present disclosure, the modeling device 10 provides an interactive interface for the user to intuitively apply the model object based on his/her demand and establish the virtual three-dimension object that is implemented in any actual real field.

In one embodiment, the model object includes a plurality of model components, and each model component includes a motion level correspondingly. The model object includes multiple default bounding boxes each corresponding to the motion level of each model component. A relative position among the default bounding boxes represents the relative connection relation among the plurality of model components.

Figure 4:
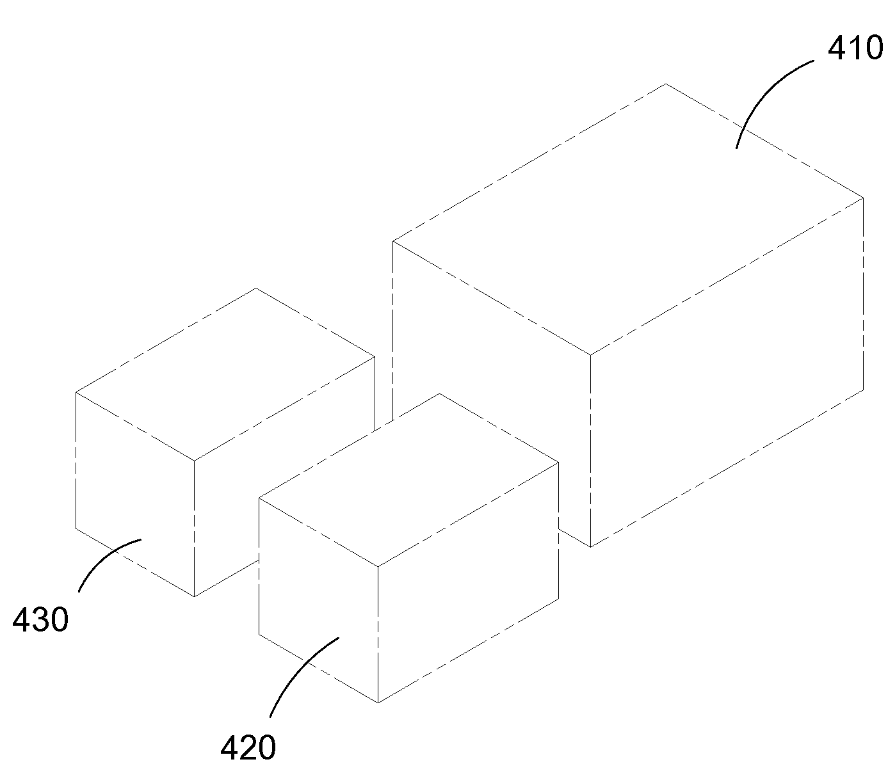
FIG. 4 is a framework diagram illustrating the motion model of the model object in accordance with one embodiment of the present disclosure.

Reference is made to FIG. 4. FIG. 4 is a framework diagram illustrating the motion model of the model object in accordance with one embodiment of the present disclosure. As mentioned above, the motion model in FIG. 3 includes the motion level of each model component of the model object and the motion type among the model components.

In one embodiment, the motion model contains an attribute field of each motion level of the model object, where a type of the attribute field is a size, an appearance (colors or textures) of the component, or other visual design data. In other words, the user may take the model object as the basic architecture and import any file containing information of the size or the appearance of the three-dimension object that is applied to establish the model, and the modeling device 10 applies the file to achieve fast establishing a virtual three-dimension object.

As shown in FIG. 4, a framework 400 of the model object includes default bounding boxes 410, 420, and 430. In one embodiment, each default bounding box corresponds to one model component. The two-finger gripper is taken as one example. The default bounding box 410 corresponds to the model component 310 (the base) in FIG. 3, the default bounding box 420 corresponds to the model component 320 (one finger of the two-finger gripper) in FIG. 3, and the default bounding box 430 corresponds to the model component 330 (the other finger of the two-finger gripper) in FIG. 3.

The default bounding boxes 410, 420, and 430 are visual presentations. The user is informed of the architecture of the model object by the entire architecture of the framework 400 (e.g., the user may confirm whether the model corresponds to the data that is applied to establish the object to be modeled by the appearance), and the information of the component attributes is added to the default bounding boxes 410, 420, and 430 one by one (e.g., the component is dragged to the default bounding box that is described later). After the modeling device 10 modifies the information of all the component attributes, a customized virtual three-dimension object is generated to be a modeled object.

Reference is made to FIG. 2. In operation S220, the processor 110 receives the object to be modeled including a plurality of components. The object to be modeled is the visual design data that is configured in advance for generating the virtual three-dimension object.

Figure 5:
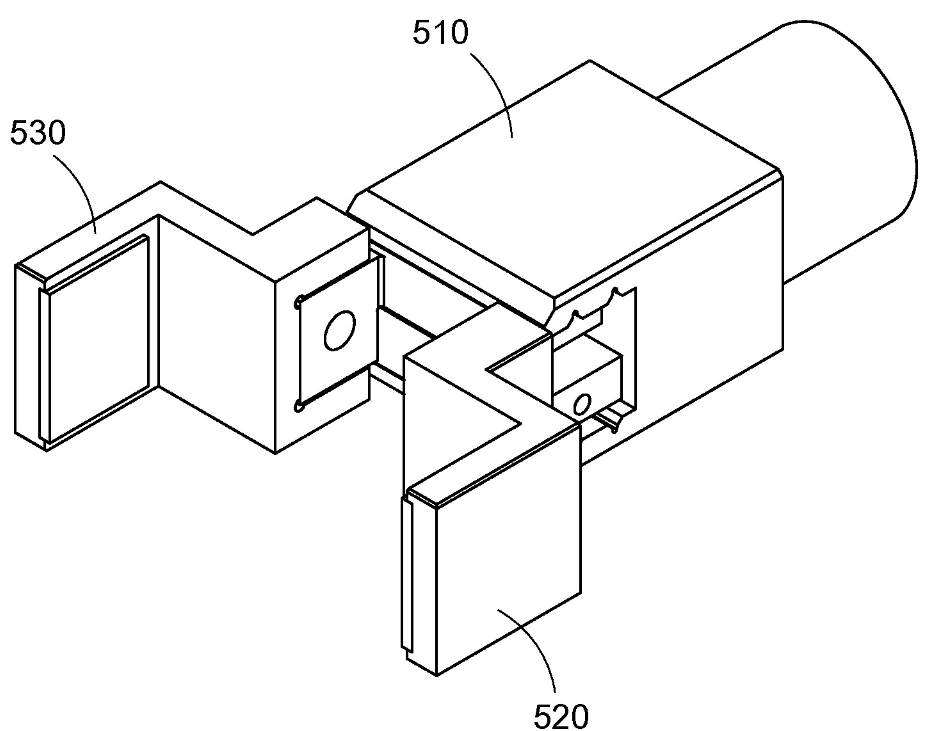
FIG. 5 is a schematic diagram illustrating an object to be modeled in accordance with one embodiment of the present disclosure.

Reference is made to FIG. 5. FIG. 5 is a schematic diagram illustrating an object to be modeled in accordance with one embodiment of the present disclosure. In one embodiment, an object to be modeled 500 is the visual design data made by a Computer Aided Design (CAD) software (e.g., stored as a CAD file format), such as AutoCAD, PRO-E, or Solidworks.

The virtual design data is the data including the size, the appearance (e.g., the color or the texture), and the like of the three-dimension object generated by the Computer Aided Design software. The user may import the CAD file as the virtual design data into the modeling device 10. The interactive interface of the modeling device 10 presents the framework 400 of the motion model (FIG. 4) and the object to be modeled 500 (FIG. 5) at the same time, so the user may implement the operations of modeling intuitively.

As shown in FIG. 5, the object to be modeled 500 is the two-finger gripper. The object to be modeled 500 includes components 510, 520, and 530. In the embodiment, the component 510 presents the actual appearance of the base of the two-finger gripper (i.e., the appearance of the virtual three-dimension object that the user desires), and the components 520 and 530 present the actual appearance of the two fingers of the two-finger gripper.

Figure 6:
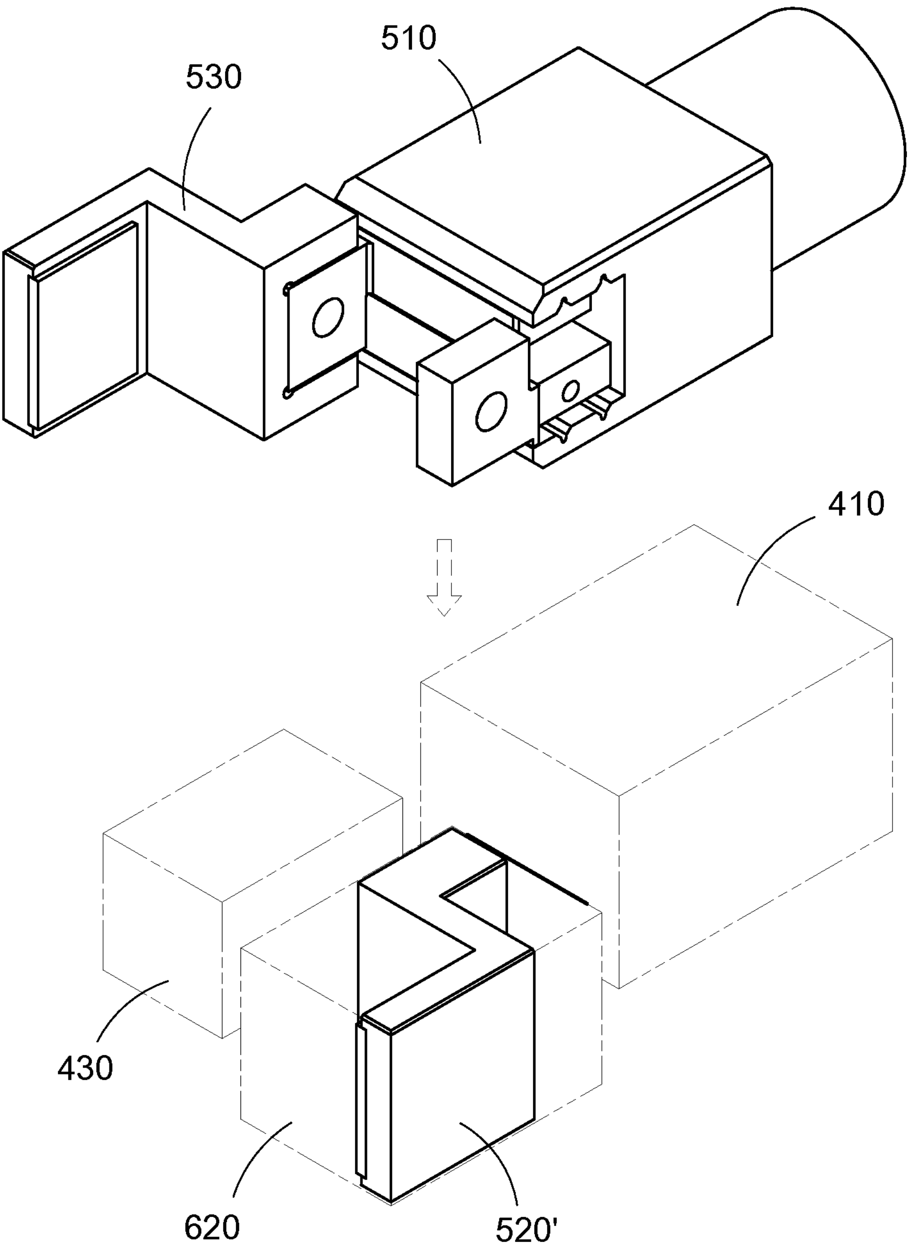
FIG. 6 is a schematic diagram illustrating an interactive interface for establishing a three-dimension object in accordance with one embodiment of the present disclosure.

Reference is made to FIG. 6. FIG. 6 is a schematic diagram illustrating an interactive interface for establishing a three-dimension object in accordance with one embodiment of the present disclosure. As shown in FIG. 6, the user may see the framework 400 of the motion model and the object to be modeled 500 on the interactive interface at the same time.

In one embodiment, the interactive interface provides functions of dragging the object to be modeled 500 for the user. For example, the user may drag respectively the components 510, 520, and 530 to assigned positions to implement modeling.

Reference is made to FIG. 2. In operation S230, the processor 110 reads the component attribute of each component of the object to be modeled 500. In operation S240, the processor 110 adjusts the motion level of each model component according to the component attribute of each component to generate a modeled component having the component attribute.

In the operation of modeling, the user may move the components 510-530 of the object to be modeled 500 to the corresponding position of the default bounding boxes 410-430 of the framework 400 one by one. For example, the component 520 of the object to be modeled 500 is moved to the position of the default bounding box 420. As mentioned above, the default bounding box 420 corresponds to the model component 320. The modeling device 10 reads the component attribute (such as the size, the appearance (the color or the texture), or other virtual design data of the component) of the component 520 and adjusts the attribute field of the motion level of the model component 320 by the component attribute of the component 520 (e.g., the size, the color, and the texture of one finger of the component 520 are written into the attribute field of the motion level of the model component 320). After the data is written into the attribute field of the model component 320, the modeling device 10 generates a modeled component 520', where the modeled component 520' contains the component attribute of the component 520 (such as the size, the color, and the texture of the finger of the component 520' are the same as those of the component 520).

In one embodiment, after the modeling device 10 generates the modeled component 520', the size of the default bounding box 420 is scaled based on the size of the modeled component 520'. For example, the size of the default bounding box 420 (FIG. 4) is scaled up to a minimum bounding box 620 (FIG. 6). The minimum bounding box 620 is a three-dimension minimum enclosing rectangle that encloses the modeled component 520'.

As mentioned above, after the user moves the component 520 to the framework 400 of the motion model, the processor 110 reads the component attribute of the component 520. The component attribute is, for example, a component size, a component appearance (the color or the texture), or other virtual design data.

Further, the processor 110 adjusts the motion level of the model component 320 based on the component size and the component appearance of the component 520 to obtain the modeled component 520'. Therefore, the attribute field of the motion level of the modeled component 520' includes the component attribute of the component 520. In other words, the size and the appearance of the modeled component 520' are the same with the size and the appearance of the component 520.

Reference is made to FIG. 2. In operation S250, the processor 110 obtains the modeled object after the motion level of each of the model components is adjusted.

In one embodiment, the processor 110 moves the components 510, 520, and 530 of the object to be modeled 500 to the positions of the default bounding boxes 410, 420, and 430 of the framework 400 of the motion model and adjusts the motion level of each corresponding model component based on the component attribute of the components 510, 520, and 530 one by one.

Figure 7:
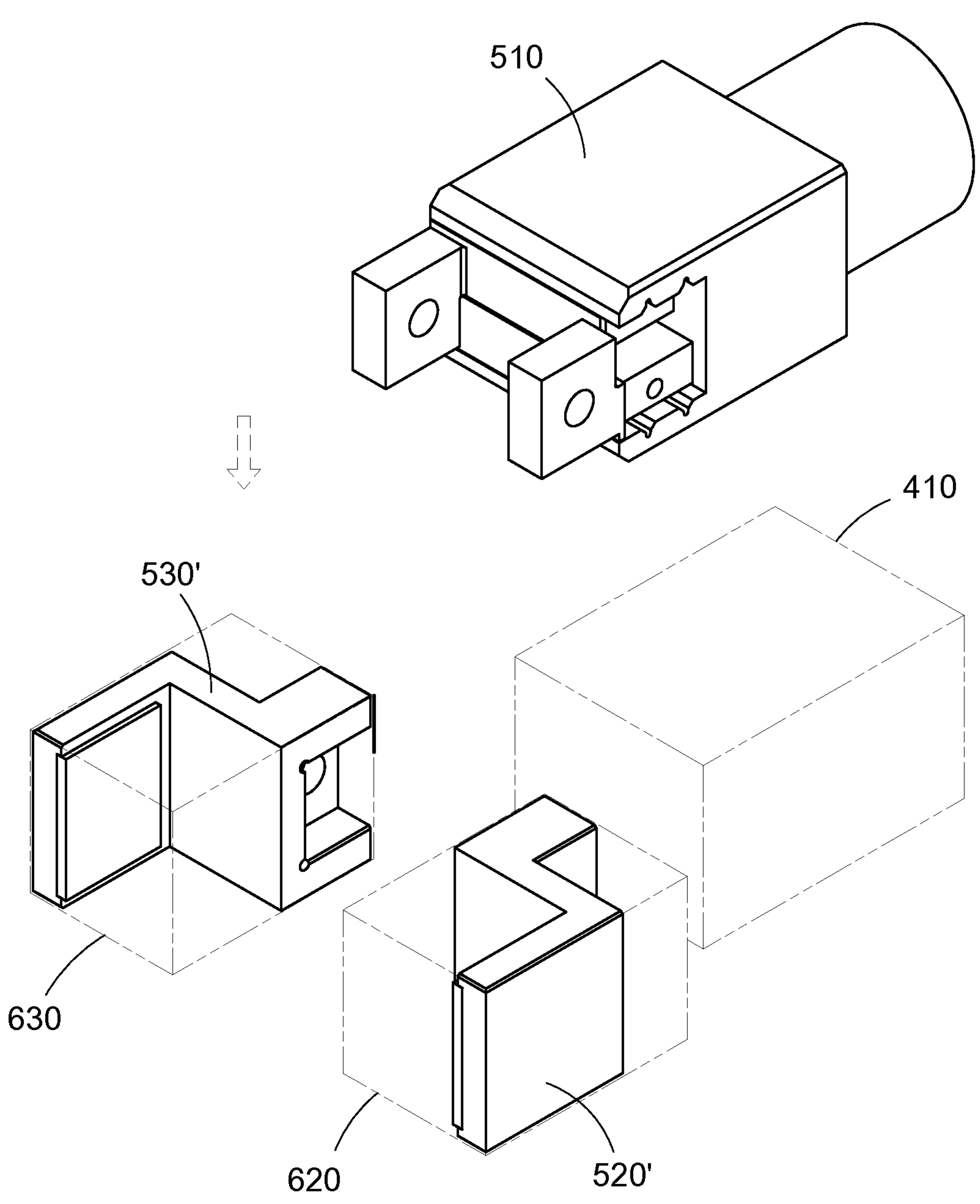
FIG. 7 is a schematic diagram illustrating the interactive interface for establishing the three-dimension object in accordance with one embodiment of the present disclosure.

Reference is made to FIG. 7. FIG. 7 is a schematic diagram illustrating the interactive interface for establishing the three-dimension object in accordance with one embodiment of the present disclosure. When the processor 110 determines that one or some model components (such as the model components 330 and 310) are yet adjusted (i.e., the attribute field of the model component(s) is empty (such as the visual design data is yet applied)), the component 530 of the object to be modeled 500 is moved to the position of the default bounding box 430 of the model component 330 and the modeled component 530' is generated (i.e., the modeling device 10 adds the virtual design data of the component 530 to the attribute field of the motion level of the model component 330).

The size of the default bounding box 430 is scaled up or down with the size of the modeled component 530'. For example, the size of the default bounding box 430 (FIG. 4) is scaled up to the size of the minimum bounding box 630 (FIG. 6). The minimum bounding box 630 is the three-dimension minimum enclosing rectangle that encloses the modeled component 530'.

Figure 8:
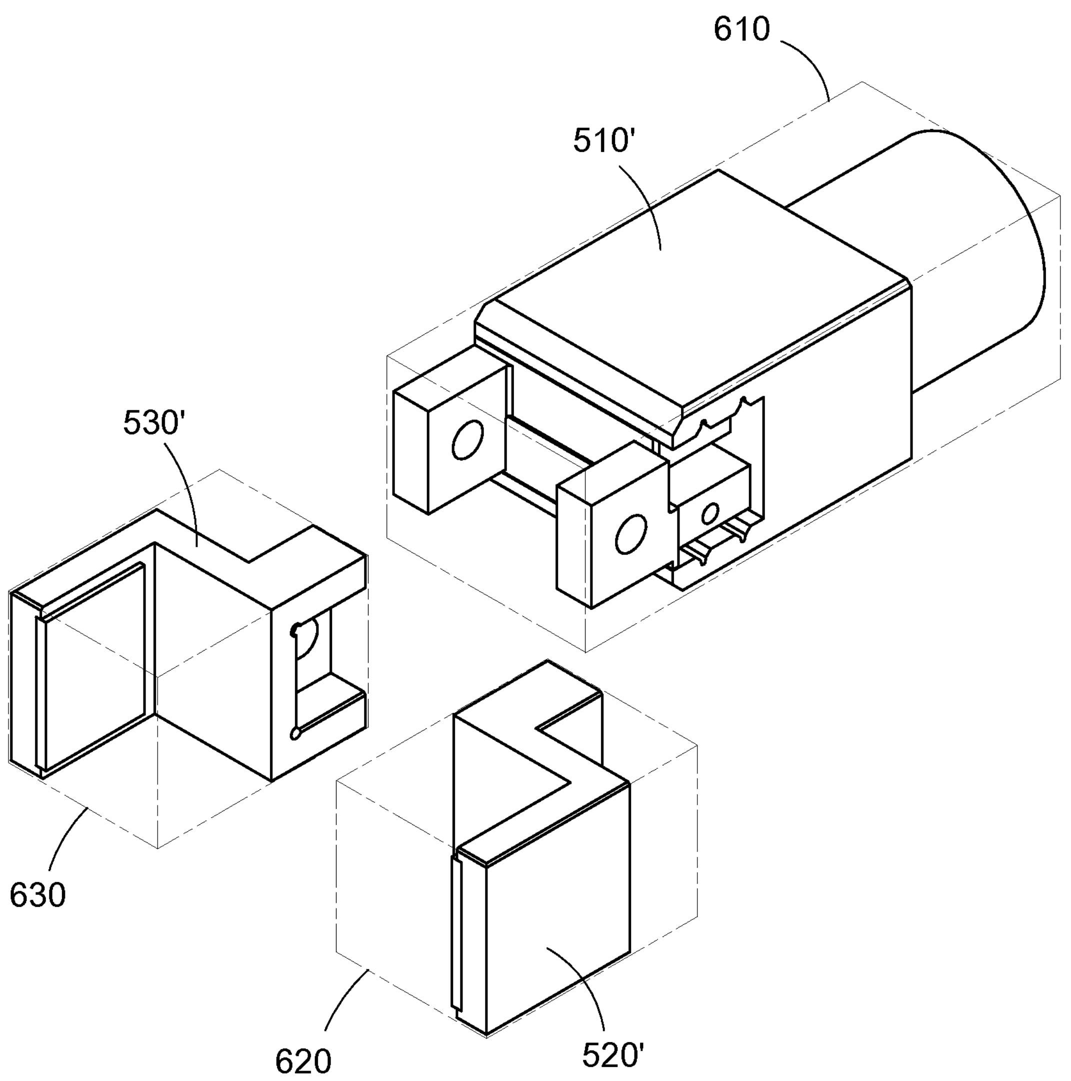
FIG. 8 is a schematic diagram illustrating the interactive interface for establishing the three-dimension object in accordance with one embodiment of the present disclosure.

In the meantime, the processor 110 determines that one motion level of the model object is yet adjusted. Reference is made to FIG. 8. FIG. 8 is a schematic diagram illustrating the interactive interface for establishing the three-dimension object in accordance with one embodiment of the present disclosure. The component 510 of the object to be modeled 500 is moved to the position of the default bounding box 410 of the model component 310 and turns into the modeled component 510' (i.e., the modeling device 10 adds the virtual design data of the component 510 to the attribute field of the motion level of the model component 310).

The size of the default bounding box 410 is scaled up or down with the size of the modeled component 510'. For example, the size of the default bounding box 410 (FIG. 4) is scaled up to the minimum bounding box 610 (FIG. 6). The minimum bounding box 610 is the three-dimension minimum enclosing rectangle that encloses the modeled component 510'.

In one embodiment, because the architecture of the motion model of the model object may be slightly different from the structure of the object to be modeled, some motion levels of the model components of the model object may be set to be the required field or the optional field (may be an empty value) according to an adjusting attribute provided in default.

In operation S240, if one model component of the model object does not correspond to any component of the object to be modeled and the processor 110 determines that the adjusting attribute of the motion level of the model component may be the empty value, the adjustment of the motion level may be skipped.

The modeled components 510', 520', and 530' in FIG. 8 are not combined to be one object yet (i.e., the modeled object), and the coordinate systems of the modeled components 510', 520', and 530' are not integrated into a unified coordinate system yet.

In one embodiment, the processor 110 combines the modeled components 510', 520', and 530' into the modeled object and integrates the respective coordinate system of the modeled components 510', 520', and 530' into the unified coordinate system.

The combined modeled components 510', 520', and 530' form the modeled object. The modeled object has the size and the appearance of the object to be modeled 500 illustrated by the user and is the virtual three-dimension object that is operable in a virtual environment. Therefore, the processor 110 accurately controls the movement of the modeled object by the unified coordinate system (e.g., the movement or the rotation).

Figure 9:
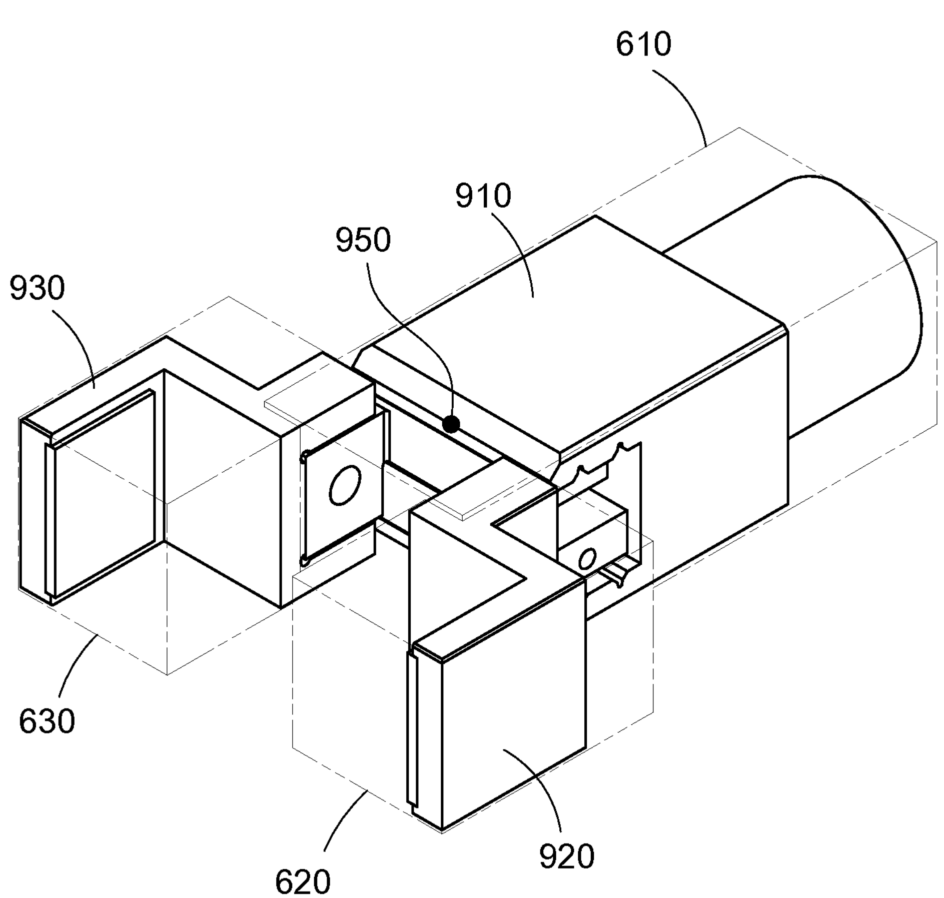
FIG. 9 is a schematic diagram illustrating a modeled object in accordance with one embodiment of the present disclosure.

Reference is made to FIG. 9. FIG. 9 is a schematic diagram illustrating a modeled object in accordance with one embodiment of the present disclosure. The processor 110 combines the modeled components 510', 520', and 530' based on the motion model of the model object. For example, a modeled component 910 (the base of the two-finger gripper) is stitched together with a modeled component 920 and a modeled component 930 (the two fingers of the two-finger gripper), and a modeled object 900 is obtained (i.e., the modeled object 900 is the two-finger gripper having the unified coordinate system).

In one embodiment, an origin coordinate 950 of the unified coordinate system of the modeled object 900 is computed according to the origin coordinates of the modeled components 910, 920, and 930 by the processor 110 (e.g., the origin coordinates of the coordinate systems of the modeled components 910, 920, and 930). In another embodiment, the origin coordinate 950 may be elected on the interactive interface of the modeling device 10 by the user.

In one embodiment, after the modeled components 510', 520', and 530' are generated (before obtaining the modeled object 900), the processor 110 respectively sets attribute values of the motion level of the modeled components 510', 520', and 530'. In another embodiment, after the modeled components 910, 920, and 930 are generated, the processor 110 respectively sets the attribute values of the motion level of the modeled components 910, 920, and 930.

The attribute values of the motion level include a position limit, a velocity limit, a friction force, and a damping force.

For example, the position limit of the modeled component 910 defines the movable rotation to left 1800 and to right 1800 along an axis and represents the motion type or the restraint of the modeled component 910.

In one embodiment, the modeling device 10 executes a three-dimension modeling software to construct the model having the three-dimension data in the virtual three-dimension space, where the three-dimension data includes the architecture design data and the virtual design data of the three-dimension object. The established model, such as the modeled object 900, may be implemented in an industrial control field, a surgery medicine field, a game design field, and the like. The virtual three-dimension object model may be applied to perform a testing process in the virtual environment. The testing process acts as a simulation before practice, so the feasibility, safety, and yield rate may be obtained to determine whether to make any remediation or improvement to reduce a failure in the practice.

As mentioned above, the modeling device and the modeling method for the three-dimension object design each motion model of the model object in advance based on the mechanical structure (such as the behavior of the industrial control component), where the motion model includes the motion level and the motion type of each model component. The user may follow the instruction of the default bounding box of the model object (e.g., whether the object to be modeled is moved into the default bounding box) to directly apply the information like the size and the appearance of the object to be modeled to the designed motion model, so the modeling of the virtual three-dimension object is fast.

In the related art, the user needs to operate a modeling software and individually designs motion levels of components (such as the features of the links), motion relations among the components, motion level attributes of the components, visual attributes of the components, and the related operations, and it is a waste of time for constructing each model in codes step by step. On the contrary, the present disclosure reduces the modeling time of establishing the virtual three-dimension object for the user. By the standardization and modulization design, the user gets the modeled objects without programming each step of the modeling processes of the virtual three-dimension object. When a large amount of model objects are pending and the pending model objects have similar motion types, the user need not spend much time operating duplicate and cumbersome modeling processes. Therefore, the modeling technique provided by the present disclosure enhances the modeling efficiency and decreases the error rate of modeling.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A modeling device for three-dimension objects, comprising:

a storage media, configured to store a plurality of program codes and pre-established frameworks respectively corresponding to different mechanical devices;

a display device for displaying an interactive interface; and a processor, connected with the storage media and the display device, and configured to load the plurality of program codes to execute operations comprising:

determining one of the pre-established frameworks as a model object framework based on the mechanical device corresponding to an unmodeled object;

loading a motion model of the model object framework, wherein the motion model indicates a plurality of model components, a motion level of each of the plurality of model components and a connection relationship among the plurality of model components;

receiving the unmodeled object, wherein the unmodeled object comprises a plurality of unmodeled components, wherein a connection relationship among the plurality of unmodeled components at least partially corresponds to the connection relationship among the plurality of model components;

reading a component attribute of each of the plurality of unmodeled components;

displaying, through the interactive interface, the plurality of unmodeled components and the plurality of model components;

in response to a user operation of moving the plurality of unmodeled components to the plurality of model components, corresponding the plurality of unmodeled components to the plurality of model components;

adjusting the motion level of each of the plurality of model components based on the component attribute of each of the plurality of corresponding unmodeled components to generate a modeled component comprising the component attribute; and obtaining a modeled object after the motion level of each of the plurality of model components is set, wherein the modeled object comprises the modeled components respectively corresponding to the plurality of model components.

2. The modeling device of claim 1, wherein the operations that the processor executes comprise:

adjusting an origin coordinate of the modeled object after obtaining the modeled object to control a movement of the modeled object based on the origin coordinate.

3. The modeling device of claim 1, wherein the operation that the processor adjusts the motion level of each of the plurality of model components based on the component attribute of each of the plurality of unmodeled components comprises:

adjusting respectively the motion level of each of the plurality of model components based on the component attribute of the plurality of unmodeled components, so an attribute field of the motion level of the plurality of model components comprises a size and an appearance stored in the component attribute.

4. The modeling device of claim 1, wherein the operations that the processor adjusts the motion level of each of the plurality of model components based on the component attribute of each of the plurality of unmodeled components comprises:

scaling a default bounding box corresponding to the model component to a size of a minimum bounding box, wherein the minimum bounding box is a three-dimension minimum enclosing rectangle enclosing the modeled component.

5. The modeling device of claim 1, wherein before the processor loads the motion model of the model object framework, the operation comprises:

establishing the motion level and a motion type of each of the plurality of model components, the motion type indicates a collaborative operation between each of the plurality of model components and other model components, wherein the motion type comprises a rotation or a slide.

6. A modeling method for three-dimension objects, comprising:

determining one of pre-established frameworks respectively corresponding to different mechanical devices as a model object framework based on the mechanical device corresponding to an unmodeled object;

loading a motion model of the model object framework, wherein the motion model indicates a plurality of model components, a motion level of each of the plurality of model components and a connection relationship among the plurality of model components;

receiving the unmodeled object, wherein the unmodeled object comprises a plurality of unmodeled components, wherein a connection relationship among the plurality of unmodeled components at least partially corresponds to the connection relationship among the plurality of model components;

reading a component attribute of each of the plurality of unmodeled components;

displaying, through an interactive interface, the plurality of unmodeled components and the plurality of model components;

in response to a user operation of moving the plurality of unmodeled components to the plurality of model components, corresponding the plurality of unmodeled components to the plurality of model components;

adjusting the motion level of each of the plurality of model components based on the component attribute of each of the plurality of corresponding unmodeled components to generate a modeled component comprising the component attribute; and obtaining a modeled object after setting the motion level of each of the plurality of model components, wherein the modeled object comprises the modeled components respectively corresponding to the plurality of model components.

7. The modeling method of claim 6, further comprising:

adjusting an origin coordinate of the modeled object after obtaining the modeled object; and controlling a movement of the modeled object based on the origin coordinate.

8. The modeling method of claim 6, wherein step of adjusting the motion level of each of the plurality of model components based on the component attribute of each of the plurality of unmodeled components comprises:

adjusting respectively the motion level of each of the plurality of model components based on the component attribute of the plurality of unmodeled components, so an attribute field of the motion level of the plurality of model components comprises a size and an appearance stored in the component attribute.

9. The modeling method of claim 6, wherein step of adjusting the motion level of each of the plurality of model components based on the component attribute of each of the plurality of unmodeled components comprises:

scaling a default bounding box corresponding to the model component to a size of a minimum bounding box, wherein the minimum bounding box is a three-dimension minimum enclosing rectangle enclosing the modeled component.

10. The modeling method of claim 6, wherein before loading the motion model of the model object framework, further comprises:

establishing the motion level and a motion type of each of the plurality of model components, the motion type indicates a collaborative operation between each of the plurality of model components and other model components, wherein the motion type comprises a rotation or a slide.

* * * * *